April 26, 1966     L. AZAR     3,248,559
DETECTION CIRCUIT
Filed July 21, 1961     2 Sheets-Sheet 1
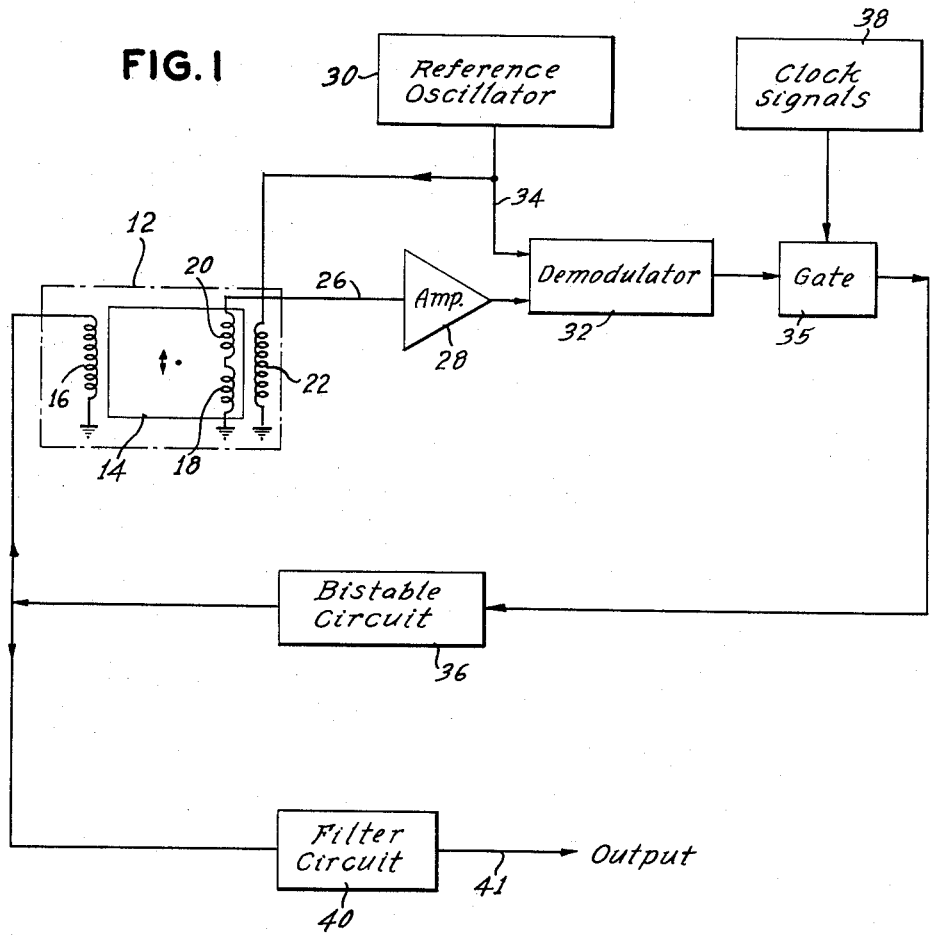
INVENTOR.
LEONARD AZAR
BY Alan C. Rose
ATTORNEYS

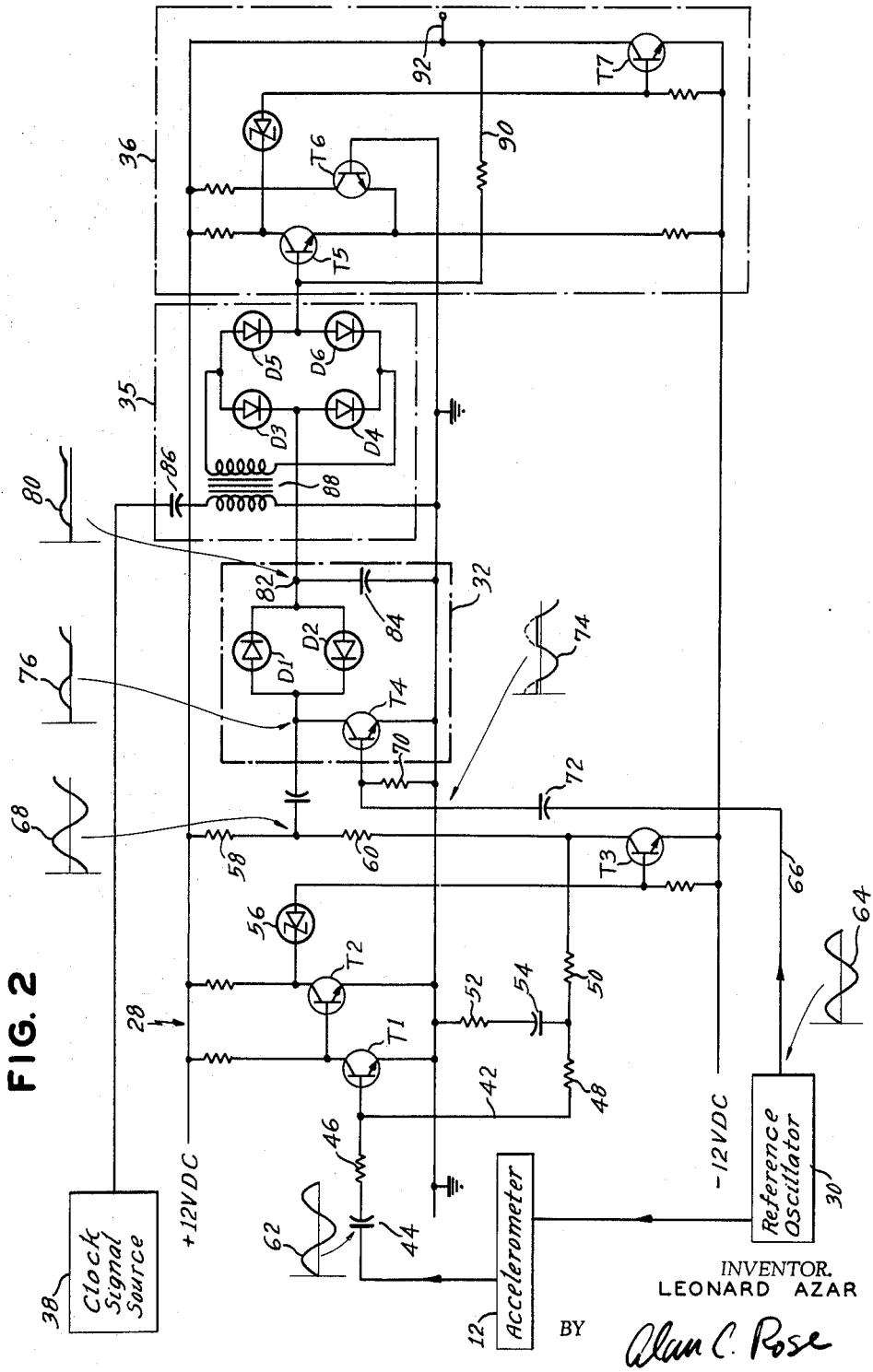

1

3,248,559
DETECTION CIRCUIT
Leonard Azar, Woodland Hills, Calif., assignor to Litton Systems, Inc., Beverly Hills, Calif., a corporation of Maryland
Filed July 21, 1961, Ser. No. 125,766
9 Claims. (Cl. 307—88.5)

This invention relates to detection circuits and more particularly to detection circuits for determining the polarity of an input signal, or whether an input signal is above or below a predetermined reference level.

In servo systems, the rebalancing circuit often involves a determination of the phase of an incoming signal. Furthermore, the phase often reverses when a change in the control signal is desired. The phase detection circuits may produce output signals which are a series of pulses, having a magnitude indicating the degree and a polarity representing the direction of unbalance.

In order to produce output signals which continuously reflect the polarity of the pulses, a filter circuit is frequently employed and the output signal from the filter circuit is sampled. However, such arrangements have the disadvantage of lagging the envelope of the detected pulses by 90 degrees. This lag can create instability in a servo loop and delay the response of the servo mechanism. Furthermore, the filter circuitry may be unnecessarily complex.

A principal object of the present invention is to provide a detector which is simpler and faster in its response than those of the prior art.

This object is achieved in accordance with the invention by the use of a pair of parallel-connected, oppositely-poled diodes. The diodes may have a threshold voltage for forward conduction of about ½ volt, for example, and are followed by a storage capacitor. When pulses of one polarity are applied to the pair of parallel-connected diodes, the capacitor is charged positively and inter-pulse charge leakage from the capacitor through the diode is limited to the threshold level for forward conduction of ½ volt. The detection circuit, therefore, follows the input signals immediately; thus, during the first negative pulse following a series of positive pulses, the output of the detector circuit is immediately switched over to the negative value. This is in contrast to a delay of 90 degrees following the envelope of the pulses which would occur in the case of a filter circuit. Accordingly, the simple pair of diodes is an effective detector, particularly for situations in which only the polarity and not the magnitude of the detected signals is important.

In accordance with a feature of the invention, therefore, the polarity of input signals is detected by a pair of oppositely-poled, parallel-connected diodes, and the output signal from the diodes is periodically sampled. In a preferred embodiment of the invention, the input signals are of pulse form and a storage capacitor is provided at the output from the detector unit. In addition, sensitive utilization circuitry is provided which is responsive to the low level binary output signals from the detector.

In accordance with additional features of the invention, the detector circuit may be included in a servo system as described above, and may form part of the phase-to-direct current voltage demodulation circuitry.

The novel features which are believed to be characteristic of the invention, both as its organization and method of construction and operation, together with further objects and advantages thereof, will be better understood from the following description considered in connection with the accompanying drawings in which illustrative embodiments of the invention are disclosed by way of example. It is to be expressly understood, however, that the drawing is for the purpose of illustration and description only and does not constitute a limitation of the invention.

In the drawing:
FIG. 1 is a block diagram of a servo system to which the present invention is applicable; and
FIG. 2 is a detail circuit diagram including the detector and associated circuits, in accordance with the invention.

The present invention involves the combination of a detector circuit with other components with which the particular detector circuit is particularly useful and advantageous. In the drawing, the detector circuit is shown in FIG. 2 as a significant part of block 32. In the following detailed description, the operation of the detector circuit is described in a section entitled "Operation of Detector Circuit Including Diodes D1 and D2," which follows the general circuit description.

*General circuit description*

The circuit of FIG. 1 shows a servo loop including an accelerometer. It is of the general type discussed in H. E. Singleton application Serial No. 638,028, filed February 4, 1957, entitled "Acceleration Measuring System." In general, the system is one in which the pendulum member of an accelerometer is maintained at or near a null position by a restoring electromagnetic coil, which counteracts the force of applied accelerations. The current to the restoring coil is a measure of the acceleration.

Referring more particularly to the drawings, FIG. 1 shows an accelerometer unit 12 including a pendulum unit 14, a torquer coil 16 for restoring the pendulum unit to its neutral position, and three additional coils 18, 20, and 22. The coils 18 and 20 are mounted on the pendulum unit and are oppositely poled with respect to the coil 22, which is fixed to the accelerometer structure. The oppositely-poled coils 18 and 20 are connected in series, and their output lead 26 is connected to amplifier 28. A reference source of signals 30 is connected both to the coil 22 and to the demodulator 32.

The coils 18 and 20 are mounted with respect to the coil 22 so that, when the pendulum unit 14 is in the neutral position, no output signal appears on lead 26. When the pendulum unit moves, however, coupling from coil 22 will increase with respect to one of the coils 18 or 20 and will decrease with respect to the other; accordingly, because the coils 18 and 20 are oppositely poled, the output signal 26 will change phase by 180 degrees when the displacement of the pendulum unit 14 shifts between positive and negative displacements. In the present system, signals of reference phase are applied on lead 34 from oscillator 30 to demodulator 32. By comparison of the signals picked up at lead 26 with the standard or reference signals supplied on lead 34, the demodulator 32 provides output signals indicating a positive or negative displacement of the pendulum 14.

The signals from the demodulator 32 are either positive or negative in sign and are limited in magnitude. Accordingly, they merely indicate the direction of displacement of pendulum 14 but not the extent of the displacement. The signals from the demodulator 32 are connected by gate 35 to a bistable circuit 36. The gate circuit 35 is periodically enabled by signals from the clock 38. The torquer coil 16 which is employed to restore pendulum 14 to its neutral position, is energized by signals from the bistable circuit 36. These signals are of a standard amplitude and change in sign as the position of the pendulum passes through the neutral position. Output signals from the accelerometer circuit appear on lead 41 at the output of the filter circuit 40.

The circuit of FIG. 2 shows the details of blocks 28, 32, 35 and 36 of FIG. 1. Thus, for example, the amplifier 28 includes the three-transistors T1, T2, and T3. Negative feedback is supplied from transistor T3 to the base input lead of transistor T1 on circuit 42. The preamplifier circuit 28 provides a gain characteristic which increases with frequency. It is intended to provide relatively high gain for the 4500 cycle per second signal of oscillator 30 and to attenuate noise signals of lower frequencies which are present in the stable platform environment of the accelerometer. The desired gain characteristic is provided by input capacitor 44 and resistor 46. The negative feedback network also contributes to this increasing gain versus frequency characteristic. The T-network in question, which is associated with circuit 42, includes resistors 48, 50, and 52, in addition to the shunt capacitor 54 which is provided to reduce the negative feeback at higher frequencies. The zener diode 56 (zener diodes being represented by a diode symbol preceded by a "Z") produces an essentially constant voltage drop between the base of transistor T3 and the collector of transistor T2. The output level from the preamplifier 28 is reduced in magnitude by the resistance network including resistors 58 and 60 to avoid overdriving the demodulator circuit 32.

As indicated by the plots 62 and 64, the signals applied to the preamplifier 28 and to lead 66 are initially either in phase (as shown), or 180 degrees out of phase. Following transmission through the preamplifier 28, the wave form 62 is shifted by 90 degrees, as indicated by curve 68. Similarly, the wave form 64 is shifted by the resistance 70 and capacitor 72 to the phase shown in plot 74. The positive peaks of the wave form 74 are clipped by transistor T4 when this transistor is energized. As indicated by wave form 76, the signals during one half cycle of the reference wave form 74 are clamped to ground potential. This is the half cycle during which the transistor T4 is energized. During the other half cycle when transistor T4 is deenergized, the collector-to-emitter circuit of transistor T4 presents an open circuit, thus permitting the application of signals to the detection circuit including diodes D1 and D2. The wave form 80 at the output point 82 of the diode detection circuit is positive when the preceding pulse applied to the diodes is positive and is negative when the preceding pulse is negative. The polarity at point 82 is maintained by the storage capacitor 84 during the period between successive pulses.

It may be noted that the pulses gated to the detector D1, D2 may be negative as well as positive. Thus, these pulses will be positive for one direction of displacement of pendulum 14 and will be negative for the other direction of displacement. The output signals at point 82 are sampled at a suitable rate such as 500 times per second. This is accomplished by the clock pulse source 38 which provides a 500-cycle per second square wave signal. This signal is differentiated by the capacitor 86 and is applied in the form of positive and negative transients to the gating circuit including diodes D3 through D6. When signals of one polarity are applied across diodes D3 through D6, which are connected across the secondary of transformer 88, they are biased in the conductive direction, whereas pulses of the opposite polarity bias the diodes in the nonconducting direction. When pulses of the proper sense are applied to diodes D3 through D6 they are all conductive, and signals from point 82 are applied directly to the base of transistor T5. These signals may be either positive or negative.

The bistable circuit 36 includes the three transistors T5, T6 and T7 and a positive feedback circuit 90. In this connection it may be noted that one phase reversal takes place from the base to the collector of transistor T5 and a second phase reversal takes place in transistor T7. Accordingly, the resistive circuit 90 provides simple positive feedback which tends to drive transistor T5 in the direction provided by the input signal. The bistable circuit 36 is sensitively adjusted to a neutral position between the positive and negative signals supplied from the detector circuit D1, D2. Accordingly, when the detected signals are positive, the bistable circuit 36 assumes one conduction state, whereas when the detector circuit supplies signals of the opposite polarity, e.g., negative, the bistable circuit 36 is switched to its other state. Output signals on lead 92 connected to the collector of transistor T7 are applied to torquer coil 16 of FIG. 1 to restore the pendulum 14 to its neutral state.

In the foregoing detailed description, the operation of certain important circuit components have been discussed in some detail. The remaining components are generally simple resistances employed for providing appropriate bias voltages to the active circuit components, or capacitors for coupling associated networks. With regard to the frequency of the signal sources which are employed, the reference signal 30 may have a frequency of 4500 cycles per second and the source of sampling signals 38 may have a frequency of 500 cycles per second. These are merely typical frequencies for an electromechanical system, and other frequencies could obviously be employed.

*Operation of detector circuit including diodes D1 and D2*

The diodes D1 and D2 are of the type which have a threshold for operation of about 0.4 or 0.5 volt. They may for example be silicon diodes. In operation, therefore, a positive or a negative voltage of 0.4 or 0.5 volt is maintained at point 82 during the half cycle interval when transistor T4 grounds the input to diodes D1 and D2. Incidentally, the transistor T4 clamps this input point to within a few thousandths of a volt of ground.

The detection circuit is particularly advantageous in its high speed of response and its simplicity. Thus, it changes in output polarity during the first half cycle in which the signal from the accelerometer changes phase. This is in contrast with conventional filter circuits which would lag the envelope of the signals at the input to the detector by 90 degrees. This increase in speed of response is useful in tightening the servo loop shown in FIG. 1 and in increasing its stability. Accordingly, for applications where only the polarity of the output from the detector is critical, the present detector circuit is a significant improvement, both in its simplicity and speed of response.

In addition to the use of ordinary diodes in a parallel-connected arrangement in the detector, two zener diodes may be employed. When zener diodes are used, they are connected directly in series. Thus, typical zener diodes which are available include a forward threshold level for conduction of about 0.6 volt and a breakdown region in the reverse conduction direction of about three volts. Accordingly, when two oppositely-poled zener diodes are employed, the threshold level is approximately three volts in the positive or in the negative direction. When series-connected zener diodes are substituted for the parallel-connected ordinary diodes D1 and D2 of FIG. 2, therefore, higher driving voltage levels are required and less sensitive output circuits may be used.

It is to be understood that the above-described arrangements are illustrative of the application of the principles of the invention. Numerous other arrangements may be devised by those skilled in the art without departing from the spirit and scope of the invention. Thus, by way of example and not of limitation, the circuits associated with the diode detector may be implemented by known components other than those disclosed in FIG. 2. Accordingly, from the foregoing remarks, it is to be understood that the present invention is limited only by the spirit and scope of the appended claims.

What is claimed is:

1. In a pulse-actuated rebalancing servo system, a servo mechanism having a null position, detector means to prevent significant phase delay in the operation of said servo system, said detector means including a pair of oppositely-poled, parallel-connected diodes, means for applying pulse signals to said detector means having a polarity representing the direction of displacement of the servo mechanism from the null position, means for restoring the servo mechanism to its null position, and means responsive to the output of said detector means for actuating said restoring means.

2. A high-speed phase-to-polarity conversion circuit comprising a first source of alternating current reference signals, means for providing input signals which are in phase with said reference signals, means for reversing the phase of said input signals, means to prevent significant phase delay in reversing output signals with change in phase of input signals, said delay prevention means including a pair of oppositely-poled diodes connected in parallel between an input point and an output point, means for applying said input signals to the input point of said pair of diodes, means for clamping the input signals to a reference level during predetermined half cycles of said reference signals, and means for sampling the signals from the output point of said pair of oppositely-connected diodes.

3. In combination detector means for preventing substantial delay in changing output signals with change in polarity of input pulse signals, said detector means including two parallel-connected, oppositely-poled diodes, means for applying pulses of varying polarity to said detector means, a storage capacitor coupled to the output of said detector means, and means for periodically sampling the output of said detector means.

4. In a pulse-actuated rebalancing servo system, a servo mechanism, detector means to prevent significant phase delay in the operation of said servo system, said detector means including a pair of oppositely-poled, parallel-connected diodes, means for applying signals to said detector means having a polarity representing the state of the servo mechanism, means for restoring the servo mechanism to its null condition, and means responsive to the output of said detector means for actuating said restoring means.

5. A high-speed phase-to-polarity conversion circuit comprising a first source of alternating current reference signals, means for providing input signals which are either in phase with said reference signals, means for reversing said input signals, means to prevent significant phase delay in reversing output signals with change in phase of input signals, said delay prevention means including a pair of oppositely-poled diodes connected in parallel between an input point and an output point, each of said diodes having at least a predetermined threshold level of conduction for the forward direction, means for applying said input signals to the input point of said pair of diodes, means for clamping the input signals to a reference level below said threshold level during predetermined half cycles of said source of alternating current reference signals, a sensing circuit having a threshold of sensitivity below said predetermined level of said diodes, and means for applying signals from the output point of said pair of oppositely-connected diodes to said sensing circuit.

6. In combination, detector means for preventing substantial delay in changing output signals with change in polarity of input pulse signals, said detector means including two parallel-connected, oppositely-poled diodes, means for applying input signal pulses of different polarity to said detector means, a storage capacitor coupled to the output of said detector means, and means for sampling the output of said detector means.

7. A high-speed phase-to-polarity conversion circuit comprising a first source of alternating current reference signals, means for providing input signals which are in phase with said reference signals, means for reversing the polarity of said input signals, means to prevent significant phase delay in reversing output signals with change in phase of input signals, said delay prevention means including a pair of parallel-connected, oppositely-poled diodes, means for applying said input signals to said pair of diodes, a transistor having its collector-to-emitter circuit connected between the input to said pair of diodes and a reference voltage terminal, means for connecting said alternating current reference signnals to the base of said transistor, and means including at least one pair of series connected diodes and a gating pulse source for periodically sampling the output signals from said pair of parallel-connected diodes.

8. A high-speed phase-to-polarity conversion circuit comprising a first source of alternating current reference signals, means for providing input signals which are either in phase or out of phase with reference signals, symmatrical circuit means to prevent significant phase delay in reversing output signals with change in phase of input signals, said symmetrical circuit means having an input and an output point and including a pair of oppositely-poled diodes for passing signals of either polarity above a predetermined threshold level from said input to said output point and for blocking return flow below said level from said output point to said input point, means for applying said input signals to said symmetrical circuit, means for clamping the input signals to a reference level during predetermined half cycles of said reference signals, and means for sampling the signals at said output point.

9. In combination, detector means for preventing substantial delay in changing output signals with change in polarity of input pulse signals, said detector means including symmetrical circuit means having an input and an output point including a pair of oppositely-poled diodes for passing electrical signals above a predetermined threshold voltage level from said input to said output point and for blocking return flow of electricity below said level from said output point to said input point, means for applying pulses of different polarity to said input point, a storage capacitor coupled to said output point, a sensing circuit responsive to voltage levels less than said predetermined level, and means for periodically gating signals from said output point to said sensing circuit.

References Cited by the Examiner

UNITED STATES PATENTS

| | | | |
|---|---|---|---|
| 2,335,265 | 11/1943 | Dodington | 329—107 X |
| 2,467,486 | 4/1949 | Krumhansl et al. | 329—107 X |
| 2,500,536 | 3/1950 | Goldberg | 329—107 |
| 2,940,306 | 6/1960 | Lozier | 73—517 |
| 2,956,272 | 10/1960 | Cohler et al. | 307—88.5 |
| 2,990,477 | 6/1961 | MacIntyre | 307—88.5 |
| 3,028,550 | 4/1962 | Naydan et al. | 73—517 |

OTHER REFERENCES

Millman et al.: Pulse and Digital Circuits, April 4, 1957 (page 113 relied on).

Soroka: Analog Methods in Computation and Simulation, McGraw-Hill, 1954 (page 205 relied on).

ARTHUR GAUSS, *Primary Examiner.*

JOHN W. HUCKERT, *Examiner.*